US010521423B2

(12) United States Patent
Brand

(10) Patent No.: US 10,521,423 B2
(45) Date of Patent: Dec. 31, 2019

(54) APPARATUS AND METHODS FOR SCANNING DATA IN A CLOUD STORAGE SERVICE

(71) Applicant: CTERA Networks, Ltd., Petach Tikva (IL)

(72) Inventor: Aron Brand, Petach-Tikva (IL)

(73) Assignee: CTERA Networks, Ltd., Petach-Tikva (IL)

( * ) Notice: Subject to any disclaimer, the term of this patent is extended or adjusted under 35 U.S.C. 154(b) by 688 days.

(21) Appl. No.: 14/811,235

(22) Filed: Jul. 28, 2015

(65) Prior Publication Data

US 2015/0331905 A1 Nov. 19, 2015

Related U.S. Application Data

(63) Continuation-in-part of application No. 12/641,559, filed on Dec. 18, 2009, now Pat. No. 9,614,924.

(60) Provisional application No. 62/030,296, filed on Jul. 29, 2014, provisional application No. 61/140,071, filed on Dec. 22, 2008.

(51) Int. Cl.
G06F 16/2453 (2019.01)
H04L 29/06 (2006.01)

(52) U.S. Cl.
CPC ......... *G06F 16/2453* (2019.01); *H04L 63/20* (2013.01)

(58) Field of Classification Search
CPC ......... G06F 17/30442; G06F 17/30174; H04L 63/20; H04L 67/1095; H04L 67/1097
USPC ........................................... 709/218
See application file for complete search history.

(56) References Cited

U.S. PATENT DOCUMENTS

| 6,470,329 | B1 | 10/2002 | Livschitz |
| 7,113,963 | B1 | 9/2006 | McCaw |
| 7,203,796 | B1 | 4/2007 | Muppalaneni et al. |
| 7,325,145 | B1 | 1/2008 | England |
| 7,430,639 | B1 | 9/2008 | Bali et al. |
| 7,596,620 | B1 | 9/2009 | Colton et al. |
| 7,752,180 | B1 | 7/2010 | Fair et al. |
| 7,865,663 | B1 | 1/2011 | Nelson et al. |
| 8,127,358 | B1 * | 2/2012 | Lee .................. G06F 21/564 726/22 |
| 8,135,683 | B2 * | 3/2012 | Douglis ............... H03M 7/30 707/693 |
| 8,595,847 | B2 * | 11/2013 | Petta .............. G06F 17/30864 709/229 |
| 2002/0095598 | A1 * | 7/2002 | Camble ............. G06F 11/1451 726/26 |
| 2003/0074574 | A1 * | 4/2003 | Hursey .............. G06F 21/562 726/22 |
| 2004/0039889 | A1 * | 2/2004 | Elder ................ G06F 11/2071 711/162 |
| 2004/0098539 | A1 * | 5/2004 | Frank ............. G06F 17/30067 711/118 |
| 2004/0143713 | A1 | 7/2004 | Niles et al. |
| 2005/0071586 | A1 | 3/2005 | Bartfai et al. |

(Continued)

*Primary Examiner* — Michael A Keller
(74) *Attorney, Agent, or Firm* — M&B IP Analysts, LLC

(57) ABSTRACT

Methods and apparati for scanning objects stored in a cloud storage system are disclosed. In an embodiment, the method includes determining at least one object that requires scanning; scanning each of the at least one object, wherein the scanning is performed using at least one scanning engine; and synchronizing the scanning results of the at least one object with a plurality of devices connected to the cloud store system.

27 Claims, 5 Drawing Sheets

(56) References Cited

U.S. PATENT DOCUMENTS

| | | |
|---|---|---|
| 2005/0097225 A1 | 5/2005 | Glatt et al. |
| 2006/0230076 A1* | 10/2006 | Gounares ............ G06F 11/2094 |
| 2006/0230245 A1 | 10/2006 | Gounares et al. |
| 2006/0239275 A1* | 10/2006 | Zlateff .............. H04L 29/12009 |
| | | 370/400 |
| 2007/0143589 A1 | 6/2007 | Rawe et al. |
| 2007/0162510 A1* | 7/2007 | Lenzmeier ........ G06F 17/30233 |
| 2007/0250593 A1 | 10/2007 | Sikdar et al. |
| 2008/0005168 A1 | 1/2008 | Huff et al. |
| 2008/0080552 A1 | 4/2008 | Gates et al. |
| 2008/0288301 A1 | 11/2008 | Emling et al. |
| 2009/0006792 A1 | 1/2009 | Federwisch et al. |
| 2009/0006869 A1 | 1/2009 | Satya |
| 2009/0007234 A1 | 1/2009 | Birger et al. |
| 2009/0031212 A1 | 1/2009 | Hsu |
| 2009/0070533 A1 | 3/2009 | Elazary et al. |
| 2009/0144422 A1 | 6/2009 | Chatley et al. |
| 2009/0288169 A1* | 11/2009 | Petta ................. G06F 17/30864 |
| | | 726/26 |
| 2009/0300169 A1 | 12/2009 | Sagar et al. |
| 2010/0042720 A1 | 2/2010 | Stienhans et al. |
| 2010/0088150 A1 | 4/2010 | Mazhar et al. |
| 2010/0149096 A1 | 6/2010 | Migos et al. |
| 2010/0274982 A1 | 10/2010 | Mehr et al. |
| 2010/0332401 A1 | 12/2010 | Prahlad et al. |
| 2013/0204849 A1 | 8/2013 | Chacko |
| 2014/0082131 A1 | 3/2014 | Jagtap |
| 2014/0082156 A1 | 3/2014 | Jagtap |

\* cited by examiner

APPARATUS AND METHODS FOR SCANNING DATA IN A CLOUD STORAGE SERVICE

CROSS-REFERENCE TO RELATED APPLICATIONS

This application claims the benefit of U.S. Provisional Application No. 62/030,296 filed on Jul. 29, 2014. This application is a continuation-in-part of U.S. patent application Ser. No. 12/641,559 filed on Dec. 18, 2009, now pending, which claims the benefit of U.S. Provisional Application No. 61/140,071 filed on Dec. 22, 2008, the contents of which are herein incorporated by reference.

TECHNICAL FIELD

The present disclosure relates generally to cloud storage services and, more particularly, to scanning data in a cloud storage service.

BACKGROUND

The demand for storage has been rapidly increasing. As the amount of data, such as digital media, stored by users grows so does their need to store digital media reliably over extended periods of time. Traditional backup solutions periodically copy data to, for example, backup tapes, compact discs (CDs), or other local storage media. However, such solutions are not optimal as the backup media is stored in a single location and media used for backup are prone to failure.

Other solutions include storing data files on a local hard-drive of a personal computer (PC) and synchronizing the data remotely using hosted storage services. Having a remote backup ensures data is stored in multiple locations, and is protected from local disasters, such as fires or floods. However, such solutions require installation of special client software on each individual PC, which is prone to software incompatibilities, lack of central control, and high deployment cost.

Commercially available services, referred to as cloud storage services, provide mass storage through a web service interface available through the Internet. FIG. 1 illustrates a storage system 100 designed to provide cloud storage services. The system 100 includes a distributed array of geographically distributed data centers 110-1 to 110-M connected to a plurality of clients 120-1 to 120-N through a wide area network (WAN) 130.

A data center 110 typically consists of servers and mass storage facilitating cloud storage services to the clients 120. Such services enable applications including, for example, backup and restoration of data, data migration, data sharing, data collaboration, and so on. Cloud storage services are accessible from anywhere in the world. To this end, each client 120 implements a web services interface designed to at least synchronize data with the data centers 110. Applications enabled by the cloud storage services are not aware of the specifics of the services and the underlying data synchronization operations. The disadvantage of commercially available cloud storage services is that such services do not implement standard file sharing protocols (e.g., common internet file system (CIFS) or network file system (NFS)). Furthermore, accessing files stored in the cloud storage is typically slower than accessing files stored in local storage devices.

Existing cloud storage networks do not permit background and real time processing of files or other types of unstructured data uploaded to a cloud storage system. In particular, background processing may include a variety of tasks, such as thumbnail creation, automatic document summarization, image resizing, video transcoding, metadata indexing, sending user notifications, and file scanning.

File scanning may be particularly desirable to allow additional services on the stored data, for example security, indexing, and analytic services. Such services can be achieved by means of scanning engines, which may be internal to the cloud storage service or implemented as external cloud storage services. Such engines may scan files or other unstructured data, store the scanning results, and potentially perform some action based on those results.

It would therefore be advantageous to provide a solution that would overcome the deficiencies of the prior art by permitting background and real time scanning of data uploaded to or stored in a cloud storage system.

SUMMARY

A summary of several exemplary embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain exemplary embodiments disclosed herein include a method for scanning objects stored in a cloud storage system. The method comprises determining at least one object that requires scanning; scanning each of the at least one object, wherein the scanning is performed using at least one scanning engine; and synchronizing the scanning results of the at least one object with a plurality of devices connected to the cloud store system.

Certain exemplary embodiments disclosed herein also include a method for block-level scanning of objects stored in a cloud storage system. The method comprises selecting at least one object stored in a cloud storage system for scanning; analyzing each new block in the at least one object, wherein the analysis is performed, in part, on each new block based on existing blocks having a previously determined safety level indication, wherein each block is a portion of the at least one object; determining, respective of the analysis, a safety level indication for each analyzed block; and handling each analyzed block respective of the determined safety level indication.

Certain exemplary embodiments disclosed herein also include an apparatus for scanning objects stored in a cloud storage system. The apparatus comprises a processing unit; and a memory coupled to the processing unit, the memory contains instructions that when executed by the processing unit configures the apparatus to: determine at least one object that requires scanning; scan each of the at least one object, wherein the scanning is performed using at least one scanning engine; and synchronize the scanning results of the at least one object with a plurality of devices connected to the cloud store system.

Certain exemplary embodiments disclosed herein also include an apparatus for block-level scanning of objects stored in a cloud storage system. The apparatus comprises a processing unit; and a memory coupled to the processing unit, the memory contains instructions that when executed by the processing unit configures the apparatus to: select at least one object stored in a cloud storage system for scanning; analyze each new block in the at least one object, wherein the analysis is performed, in part, on each new block based on existing blocks having a previously determined safety level indication, wherein each block is a portion of the at least one object; determine, respective of the analysis, a safety level indication for each analyzed block; and handle each analyzed block respective of the determined safety level indication.

Certain exemplary embodiments disclosed herein also include a method for synchronizing objects between a network attached storage device and a cloud storage service (CSS), wherein the CSS is geographically distributed from the network attached storage device, comprising: marking all objects that have been changed since the last synchronization; dividing all marked objects into variable size blocks; assigning each block with a unique code; determining which blocks have been modified using the unique codes of the blocks; synchronizing the modified blocks such that both the CSS and the storage device include a consistent version of each object that has been changed; and scanning each modified block to detect potential threats.

BRIEF DESCRIPTION OF THE DRAWINGS

The subject matter that is regarded as the disclosed embodiments is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
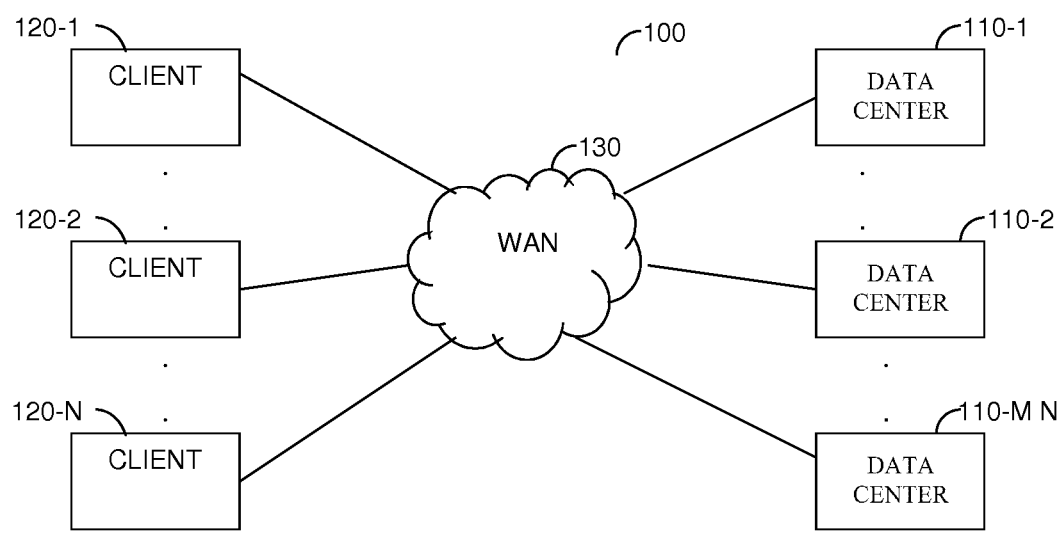
FIG. 1 is a block diagram illustrating a storage system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for scanning unstructured data in a cloud storage service. The system includes a cloud connector, a background scanner, a high priority scanner, at least one file database, and a plurality of cloud scanning drivers. Components of the system perform scanning according to a scanning policy, which specifies which objects need to be scanned by each scanner. The method includes asynchronous scanning of data uploaded to a cloud storage service based on a scanning policy.

The various disclosed embodiments allow for improved security by permitting fast and/or remote detection of threats, thereby mitigating threats globally across an enterprise. Threats that may be mitigated include, for example, "dark data" stored in network attached storage (NAS) appliances located in remote offices or on employee personal computers. Additionally, the various disclosed embodiments may enable organizations to gain richer, deeper, and more accurate insights into stored data by permitting scanning and analyzing of entire volumes of data across an enterprise from a single cloud-based system.

Figure 2:
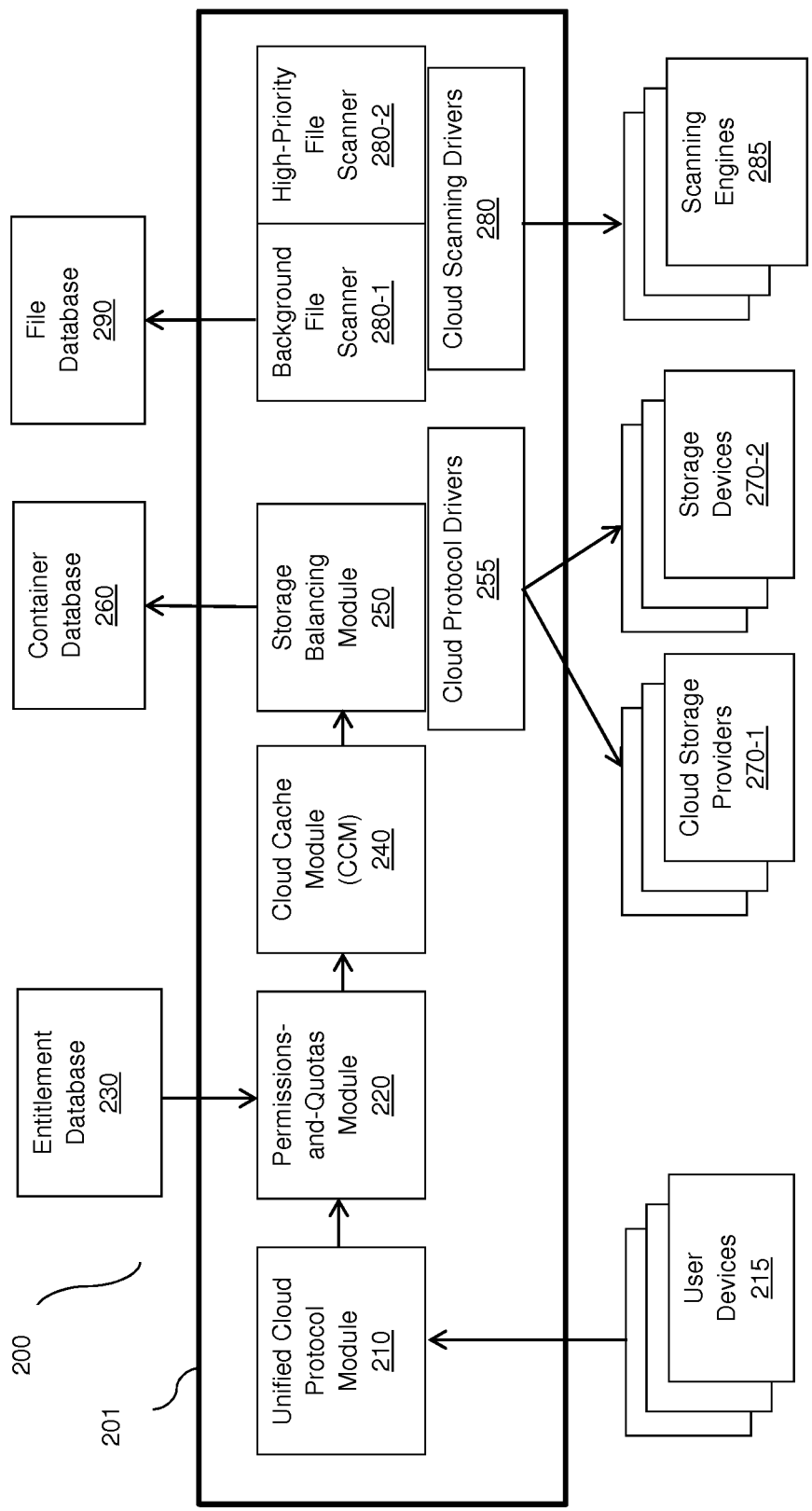
FIG. 2 is a block diagram of a cloud connector implemented in a system for scanning unstructured data in a cloud storage service according to one embodiment.

FIG. 2 is an exemplary and non-limiting block diagram of a cloud connector 201 implemented in a system 200 for scanning unstructured data in a cloud storage service according to an embodiment. Scanned data may include, but is not limited to, objects or groups of objects uploaded to or otherwise stored in a cloud storage service. The cloud connector 201 may be utilized to interface between the user devices 215 and the storage devices 270-2. In an embodiment, an object includes a file (in any format), a data group, or any type of data that can be stored.

Due to a lack of universal standards for cloud storage providers, many providers use proprietary interfaces and protocols. Such proprietary interfaces and protocols may be made available using a unified communication protocol 210, thereby allowing access to one or more cloud storage providers 270-1. In addition to providing a unified interface to cloud storage providers 270-1, the cloud connector 201 can provide the same interface for storage devices 270-2.

The cloud connector 201 also includes a permissions-and-quotas module 220, a cloud cache module (CCM) 240, a storage balancing module 250, and one or more cloud protocol drivers 255. In an embodiment, the cloud connector 201 may be communicatively connected to a service entitlement database 230.

The permissions-and-quota module 220 enforces and restricts access of user devices 215 to objects according to a list of access control rules. The permissions-and-quotas module 220 may also enforce storage quotas for each user device 215 and may provide differentiated service levels per customer. As an example, a permissions-and-quotas module may permit a user to save a specified total data size. If a user attempts to write data that would exceed the total specified data size, a notification may be sent to the user indicating that the operation cannot be performed.

The entitlement database 230 is used to store a service level agreement (SLA) for each of the customers having access through clients (not shown) subscribed to the third party cloud storage services 270-1. When a customer connects to a cloud storage service (CSS), the entitlement database 230 is accessed to check whether the customer is entitled to the requested service. A customer may be entitled to the requested service if, e.g., the SLA permits reading and/or writing of the type and/or size of data. In addition, the entitlement database 230 may contain additional service level information, such as storage and bandwidth quotas for each customer. The CCM 240 may cache recently or frequently accessed objects locally for reduced latency and communication costs to providers of cloud storage services.

The storage balancing module 250 performs load balancing between multiple cloud storage providers 270-1 and possibly multiple local storage devices 270-2 based on criteria including, but not limited to, performance, cost, and reliability. For example, a simplistic balancing scheme may include storing twenty percent of data being saved to a storage device 270-2, and the remaining eighty percent to a cloud storage provider 270-1. The split between the cloud storage providers 270-1 can be either static (e.g., according to the object code) or dynamic (e.g., based on the current cost and availability of each cloud storage provider). The storage balancing module 250 may further be connected to a container database 260. The container database 260 may be utilized to manage one or more of the cloud storage providers 270-1 and/or one or more of the storage devices 270-2. The cloud protocol drivers 255 may be utilized for interfacing with storage devices 270-2 and with cloud storage providers 270-1.

According to certain embodiments, the cloud connector 201 also includes one or more cloud scanning drivers 280. The cloud scanning drivers 280 may include, but are not limited to, a background scanner 280-1 and a high-priority scanner 280-2. The cloud scanning drivers 280 are communicatively connected to the scanning engines 285 and to a file database (FDB) 290. The cloud scanning drivers 280 may be utilized to interface with a variety of internal or external content scanning engines 285. Various examples of scanning engines 285 may include, for example, threat detection scanners (e.g., antivirus scanners, malware scanners, and the like), full-text indexing engines; image cataloguing and metadata extraction engines; content type detection engines; e-discovery and data mining engines; unstructured data analytics engines; and so on.

The cloud scanning drivers 280 may be built into the system, or may be dynamically loaded. The background scanner 280-1 is configured to scan uploaded objects in the background. The high-priority scanner 280-2 is executed only when an object is requested to be read. In an embodiment, the high-priority scanner 280-2 scans objects in the foreground if they are read before being scanned by the background scanner 280-1.

The scanning engines 285 generally scan files or other objects, wherein the results of such scanning may be stored in either the FDB 290 or in files stored in the cloud storage. In a preferable embodiment, multiple scans are executed in parallel using, e.g., a thread pool. The FDB 290 is further configured to track which files and/or objects have been scanned.

According to certain configuration, the scanning engines 285 are either idempotent or not idempotent. Idempotent scanning engines may generally be applied multiple times without changing the result beyond the initial application. For example, performing antivirus scanning or indexing of a particular file multiple times will yield the same scan result each time. Scanning engines that are not idempotent typically have some side effects that affect results of the scan in subsequent applications.

In an embodiment, the scanning engines 285 may be assumed to be idempotent. Thus, scanning results do not need to be immediately saved to a disk upon completion of a scan. Rather, multiple results can be obtained in a single transaction, thereby reducing the required database transaction rate and improving performance. Additionally, if the system 200 is shut down abruptly, the last transaction may be rolled back. When a transaction is rolled back, files that were being scanned during and/or immediately prior to the failure may be scanned again when scanning resumes.

In another embodiment, one or more of the scanning engines 285 do not require access to an entire file or other object. For example, such a scanning engine 285 may require only a specific prefix (e.g., the first few bytes of string) of the data in order to extract metadata. In such cases, a scanning engine 285 can read selective portions of the data and, thus, does not require access to the entire object to complete reading.

In yet another embodiment, one or more of the scanning engines 285 may only require access to metadata. In such embodiments, reading of the object may be considered completed even if the scanning engine 285 performing reading did not actually access the object directly. For example, when indexing files, the sequence number or other index identifier of the file may be required for reading, but the data's content may not be necessary.

It should be noted that some scanning engines 285 do not require information related to a file name, owner, location, and other metadata. In an embodiment, scans performed by such scanning engines 285 rely only on the data content itself. An antivirus scanner is an example of a scanning engine 285 that does not typically require metadata. Such scanning engines 285 can cache their previous scanning results based on a file's MAPHASH value. A file's MAPHASH value is a cryptographic hash of the file map. Files having the same MAPHASH values have identical content with nearly absolute probability and, therefore, a MAPHASH is a reliable identifier of file content. A new hash is only computed on new objects.

It is often advantageous to identify data contents by their MAPHASH rather than by a hash of the data's contents because it is relatively easy to calculate the hash if the data was modified such that only some objects of the data were changed. This calculation does not require reading all unmodified objects from the cloud storage. Thus, this approach typically improves performance and reduces costs.

In some embodiments, looking up previous cached scan results of an object by its MAPHASH can be accomplished by keeping a key-value data structure such as a hash table, where the key is MAPHASH and the value is a previously scanned data identifier having the MAPHASH. This data structure can be persisted periodically together with a high watermark. High watermarks are described in more detail herein below with respect to FIG. 3.

In some implementations, the key-value data structure is used merely as a work-saving cache and is not strictly required for correct system operation; it is possible to reduce the size of the data structure by removing some entries based on, e.g., an eviction policy. An eviction policy contains information that may be used to determine which entries should be removed (evicted) from a data structure. The reduced size of the data structure may permit the data structure to be stored entirely in RAM, thereby reducing the frequency of disk access.

In a typical embodiment, the cloud storage service may use multiple cloud connectors 201 in a cluster configuration without shared memory. In such embodiments, it is possible to implement the data structure as an in-memory distributed hash table (DHT). This implementation may be performed by, e.g., using widely available software such as, but not limited to, Memcached, Hazelcast, or Apache Cassandra.

The FDB 290 typically contains a list of files and file versions in the system 200 as well as the file map, a list of object identifications (IDs) needed to reconstruct each file. The file maps may be stored in cloud storage, in a storage device, and/or directly in the FDB 290. In an embodiment, there may be multiple shared FDB servers, wherein each server is responsible for a specific subset of a file namespace. This embodiment may be particularly helpful in large scale systems. In various other embodiments, the FDB 290 may also contain information related to any objects that are not files in addition to or instead of information related to files.

According to one embodiment, a cloud storage service may utilize multiple cloud connectors 201 in a cluster configuration without a shared memory. As a result, in such an embodiment, two or more cloud connectors 201 may be prevented from scanning the same files. In an embodiment, the cloud connectors 201 may be prevented from scanning the same files by, e.g., initiating a database lock when scanning begins that prevents other cloud connectors from accessing a file until scanning is completed. In another embodiment, scanning may be performed by a process running on all of the FDB servers, or on a dedicated server for all FDBs 290. In that embodiment, locking may not be required.

Figure 3:
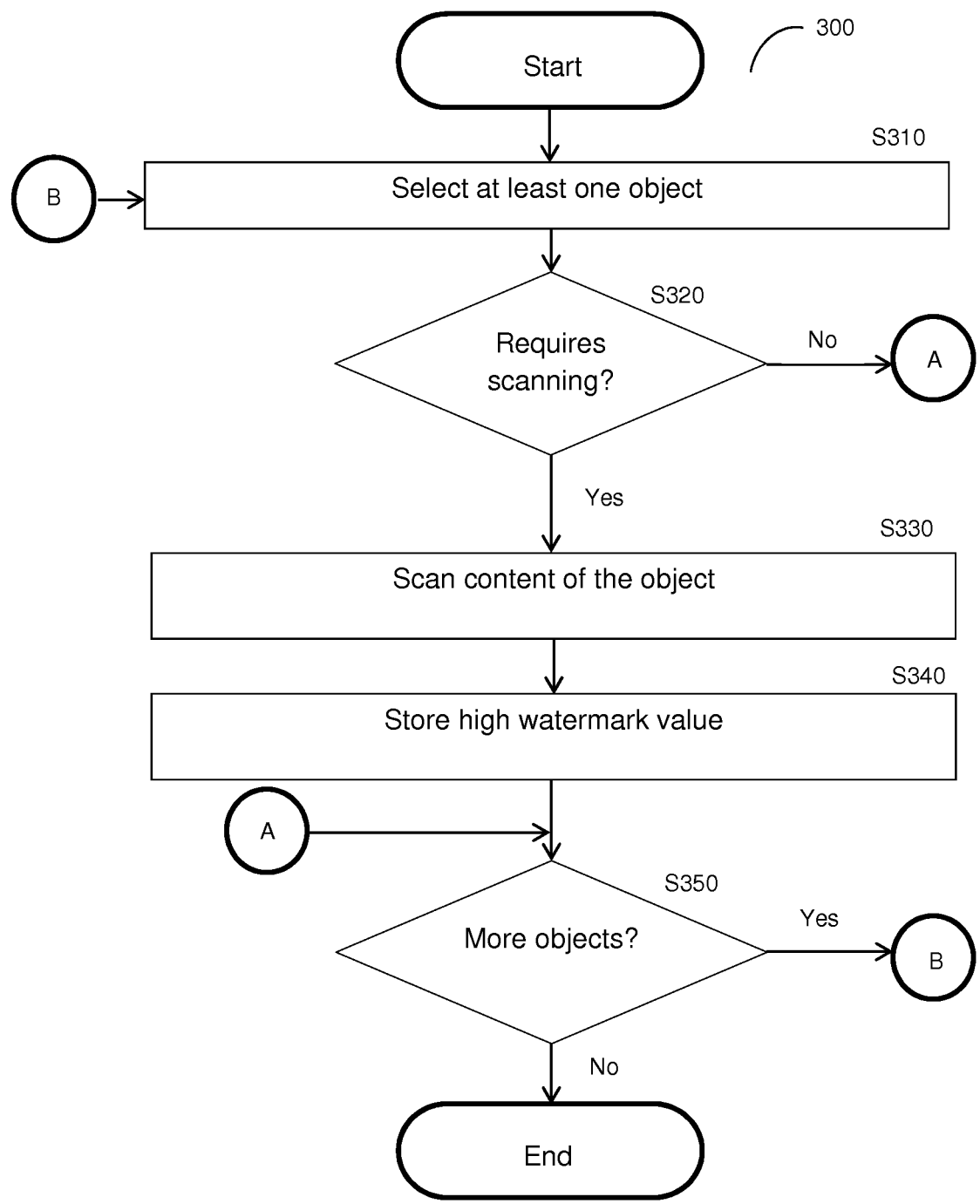
FIG. 3 is a flowchart illustrating a method for watermarking data in a cloud storage service according to one embodiment.

FIG. 3 shows an exemplary and non-limiting flowchart 300 illustrating a method for scanning objects according to an embodiment. In S310, an object is selected. In an embodiment, a background process may find and select objects which have not yet been scanned based on a scanning policy. In an exemplary and non-limiting embodiment, a scanning policy specifies which objects need to be scanned by each of the scanners based on specified criteria. Such criteria may include, but is not limited to, metadata, type, origin, and/or location.

In an embodiment, scanning engines are categorized as either blocking or non-blocking. For blocking scanning engines, completion of scanning is a precondition for reading data. Such a precondition is typically used for security scanners. For non-blocking scanning engines, data may be read by users even if such files have not yet been scanned.

As a non-limiting example of a scanning policy applied to objects uploaded to a cloud storage service, the first object having a sequence number greater than a stored high watermark may be selected for scanning. In a further embodiment, any object identified as previously scanned may not be selected, regardless of sequence number.

In some embodiments, an automatically incrementing database sequence may be used to assign a monotonically increasing sequence number to each object. Sequence numbers are typically used for indexing objects or other objects in an objects (or files) table of a FDB. The columns of such table may be indexed using order-preserving index schemes such as btree. Such indexing may result in objects indexed according to order of arrival.

In S320, it is determined whether the object requires scanning. The determination may be based on the scanning policy and a watermark value (discussed below). If so, execution continues with S330; otherwise, execution continues with S350. In an embodiment, if an object is determined as not requiring scanning, it may be identified as such.

In S330, the contents of the object are scanned by one or more scanning engines. In S340, based on the results of scanning, a high watermark value is stored for the object. A high watermark (HWM) value may be stored for each scanning engine, wherein the HWM is the highest sequence number that has been scanned or determined to not need scanning as of HWM storage. The HWM may be stored periodically to persistent storage, but does not necessarily need to be stored after every scanning operation.

In one embodiment, the HWM may be persistently stored after every scanning batch is completed. When scanning resumes, the last stored HWM is read from persistent storage. A database (e.g., FDB 290) is queried for objects with sequence numbers greater than the HWM. Any objects that have been identified as previously scanned are ignored. The remaining objects may be evaluated to determine if they require scanning and, if so, are scanned. This persistent storage allows for efficient enumeration of the changed objects while minimizing loss of work in case scanning ends abruptly. In S350, it is checked whether additional objects require scanning. If so, execution continues with S310; otherwise, execution terminates.

Figure 4:
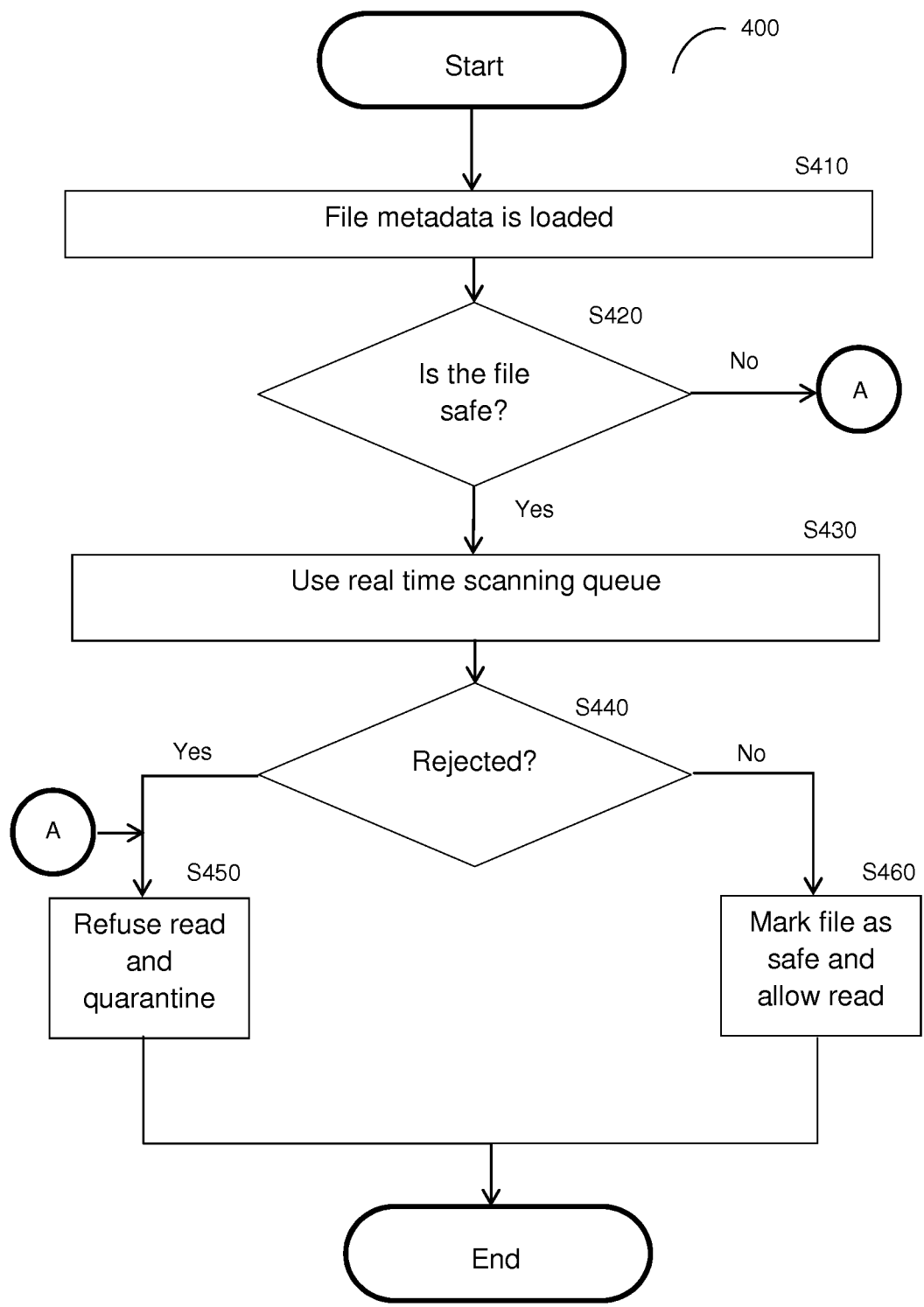
FIG. 4 is a flowchart illustrating a method for determination of pre-scan safety checking of objects according to one embodiment.

FIG. 4 is an exemplary and non-limiting flowchart 400 illustrating a method for determining safety of objects according to an embodiment. In S410, a metadata of an object to be scanned is loaded. The object metadata may include metadata related to, e.g., object safety, previous scans, and so on.

In S420, it is determined whether the object is identified as safe. If so, execution continues with S430; otherwise, execution continues with S450. Each object may have a SAFE flag designated in the metadata associated with the object. The SAFE flag represents the safety status of the object (i.e., whether the object is safe or not safe), and may be either true (for safe objects) or false (for unsafe objects). When the object is uploaded, it is determined whether any blocking scans are required as preconditions for reading the objects. This may be determined respective a scanning policy associated with the user. If any blocking scans are required, the SAFE flag is initialized to false. Otherwise, the SAFE flag is initialized to true. In an embodiment, objects may be hidden until they are identified as safe.

In an embodiment, the SAFE flag does not need to be persistently updated after each scan. Rather, to minimize the transaction rate, it is typically preferable to persist this flag to disk only periodically. Until the flag is persisted, an in-memory data structure may be used to store identifying information of objects which were recently identified as having SAFE flags that were true. Such data structure generally must be consulted prior to each object selection.

In another embodiment, if an interactive process attempts to access an object that has not yet been marked as safe, the response is delayed until a result is available. In a further embodiment, a notification may be sent to the user indicating that the object is undergoing scanning. The object may be sent to a separate, high priority scanning queue which performs the required scanning in near real-time. In some embodiments, this scanning may be performed without waiting for completion of background scanning. In this embodiment, if an object is marked as safe by the high priority scanning queue, the read process resumes. If the object is marked as unsafe, an appropriate error message may be returned.

In S430, the metadata is scanned according to a scanning queue. In an embodiment, this scan is performed in real-time. In S440, based on the scanning, it is determined whether the object has been rejected. If so, execution continues with S450; otherwise, execution continues with S460.

In S450, the object is prevented from being read and quarantined. Quarantining of an object typically involves moving the object to a quarantine area which may be cleared or processed by a privileged user. In an embodiment, if an object is rejected, the object may be deleted. It should be noted that the cloud storage system can be utilized to share content between users. For example, in enterprises, data can often be shared between different departments, branches, and individual users. Each such entity that can save or share files is typically assigned different permission rules, etc.

Furthermore, each user may use a different type of device, which may be, but is not limited to, a PC, a smartphone, a storage appliance, a file server, and so on. Thus, a folder stored in the cloud storage (a data center 110) can be accessed by multiple different users from different geographical locations. Further, a copy of the object can be saved in each such device (endpoint) communicatively connected to the cloud storage system. In such configuration, upon deletion of the object from the cloud storage, the object may also be automatically removed from all devices (end-points) synchronized with the cloud storage service.

In S460, the object is marked as safe and reading of the object is allowed. It should be appreciated that safety of any type objects or objects may be performed without departing from the disclosed embodiments.

Figure 5:
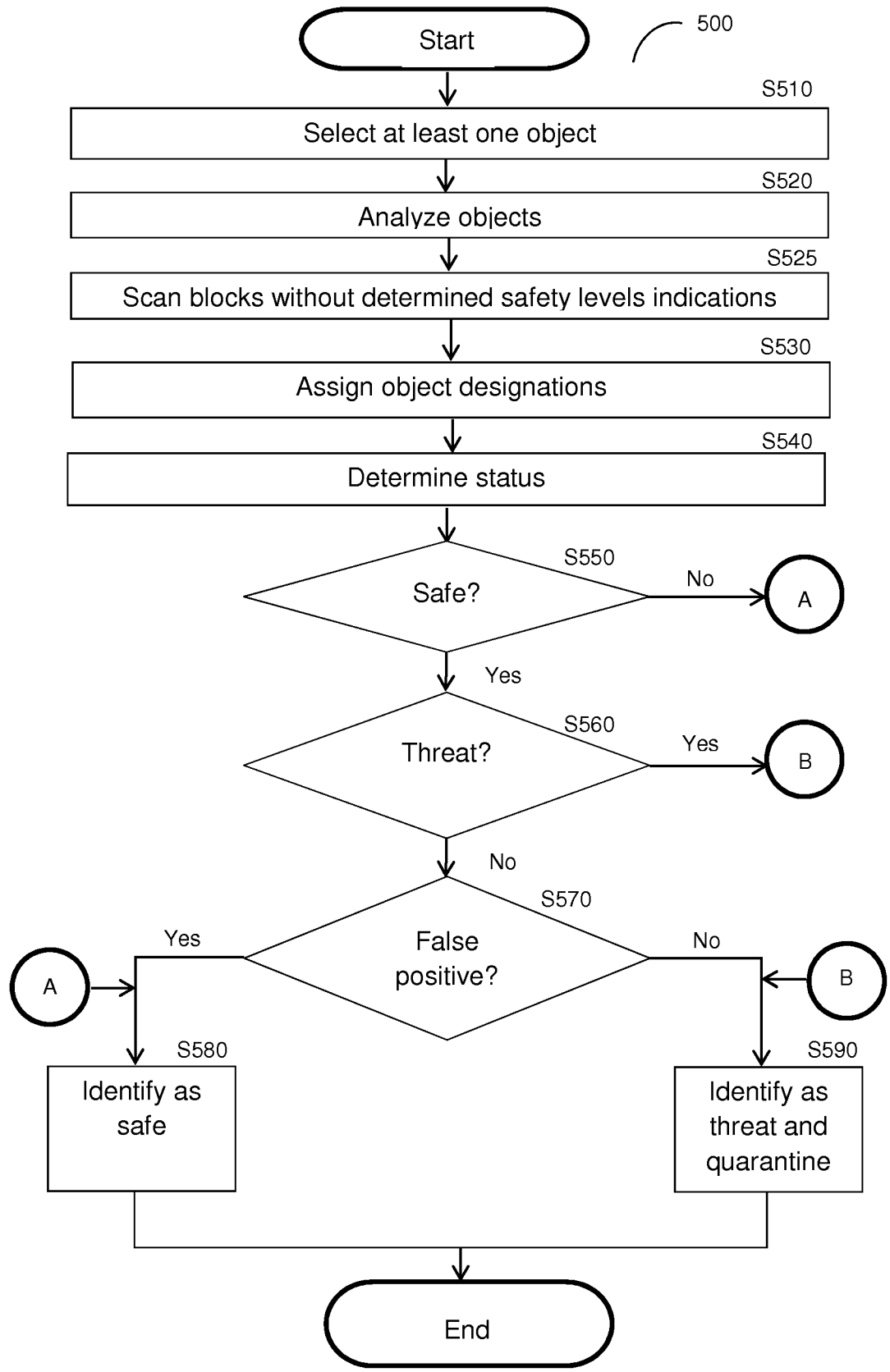
FIG. 5 is a flowchart illustrating a method for object level scanning according to one embodiment.

FIG. 5 is an exemplary and non-limiting flowchart 500 illustrating a method for block level scanning according to an embodiment. An object, e.g., a file may consist of a plurality of data blocks. In certain cases, there is no need to scan the entire object, but rather only portions of the object.

For example, if small changes are frequently made to a large file or other group of data (e.g., a large database file), it would be resource intensive to scan or process the entire object more than once. Thus, in some cases, it is advantageous to utilize stored knowledge regarding processing of a previous version of a group of data, or of other groups of data containing similar or identical objects or data blocks. As an example, string matching (e.g., detecting malware and/or sensitive data) may only involve updating certain data blocks in a file rather than the entire file. Additionally, when an object is only partially updated, only the newly modified blocks and/or blocks adjacent to newly modified objects contain data that should be rescanned. Thus, scanning by portions of objects rather than by object may be advantageous in certain circumstances.

In S510, an object to be scanned is selected. In an embodiment, a background process may find and select objects which have not yet been scanned based on a scanning policy. Scanning policies are described in more detail herein above with respect to FIG. 3. In S520, the blocks in the object are analyzed. In an embodiment, S520 includes searching for identical blocks having a previously determined safety level indication. For blocks having identical blocks with safety level indication of safe or threat, no further processing is performed. In S525, blocks that without determined safety level indications are scanned using at least one threat scanning engine. The results of the scanning are saved respective of each block.

In an embodiment, further analysis is performed on blocks determined to be suspected. The analysis may include string or patent matching between strings/patterns of blocks in the object and one or more strings/patterns identifying potential threats.

In S530, based on the results of the analysis, each data block is designated with a safety level indication. In an embodiment, the safety level indication may be safe, threat, or suspect. Blocks indicated as 'safe' do not demonstrate any substring match. Blocks indicated as 'threat' demonstrate an exact string match (i.e., the strings are identical) to a string known as a threat. An example for such a string is a known virus signature. Suspect blocks demonstrate, e.g., a non-trivial prefix or non-trivial suffix match. In an embodiment, suspect blocks may also include any blocks that are immediately adjacent to one or more blocks demonstrating a non-trivial prefix or suffix match.

A non-trivial prefix match occurs when the beginning portions of strings overlap at least a specified amount. A non-trivial suffix match occurs then the end portions of strings overlap at least a specified amount. Matches that are non-trivial may be, for example, matches of 4 or more bytes when each string includes at least 7 bytes.

In S540, the status of the object is determined based on the designated safety level indication of at least one data block of the object. The object status may be safe, threat, or potential threat. Any object consisting entirely of safe objects is determined to be safe. Any object containing one or more threat blocks is determined to be a threat. Any object containing one or more suspect blocks is determined to be a potential threat.

In S550, it is checked whether the object was determined to be safe. If so, execution continues with S580; otherwise, execution continues with S560. In S560, it is checked whether the object was determined to be a threat. If so, execution continues with S590; otherwise, execution terminates.

In S570, upon determining that the object has not been determined to be safe or a threat (i.e., at least one block of the object has been determined to be suspect), it is determined whether the suspect status is a false positive. In an embodiment, this determination may involve reading strings of adjacent suspect objects and performing a full string match to determine whether the entire threat pattern has actually been found.

In S580, upon determining that the object is safe, the object is identified as safe. In S590, upon determining that the object is a threat, the object is identified as a threat and quarantined. It should be appreciated that a data block may be an object or a portion of an object.

The block level scanning discussed with reference to FIG. 5 is highly advantageous in a de-duplication storage system. In such systems, a single copy of a block is saved where multiple objects can share the single block using pointers. In an embodiment, the method allows scanning only the unique blocks of a newly stored object, while avoiding rescanning blocks that were already previously scanned.

It should be understood by one of ordinary skill in the art that the embodiments described herein above are exemplary and non-limiting. Particularly, any of the various disclosed embodiments may be implemented for scanning unstructured data that is not a file without departing from the scope of those embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for scanning objects stored in a cloud storage system, the scanning of the objects being for a purpose other than detecting a volume failure issue, comprising:
    determining that at least one of the objects stored in the cloud storage system requires scanning;
    scanning each of the at least one object, wherein the scanning is performed using at least one scanning engine;
    tracking objects that have been scanned by:
        assigning a monotonically increasing sequence number to each object;
        setting a high watermark value, wherein the high watermark value is a highest sequence number that has been scanned, thereby the high watermark value determines in part if subsequent scanning for the at least one object is required; and
        storing the high watermark value;
        wherein, in the determining step, only objects having a sequence number higher than the stored high watermark are determined to require scanning; and
    synchronizing the at least one object with a plurality of devices connected to the cloud storage system based on the scanning results.

2. The method of claim 1, wherein the determining if the at least one object containing at least one object requires scanning further comprises:
    checking a scanning policy for the at least one object, wherein the scanning policy defines at least a type of the at least one scanning engine.

3. The method of claim 1, wherein at least one scanning engine is a blocking scan, wherein the blocking scan requires completion of the scanning prior to allowing access to the object.

4. The method of claim 1, wherein the scanning further comprises:
    scanning at least one object using any one of: at least one scanning engine running as a background process and at least one scanning engine running as a foreground process, wherein the foreground process is triggered by an access attempt to the at least one object.

5. The method of claim 1, wherein the at least one scanning engine is any one of: a full-text indexing engine; an image cataloguing and metadata extraction engine, a content type detection engine, an e-discovery and data mining engine, an unstructured data analytics engine.

6. The method of claim 1, further comprising:
    caching the at least one scanned object based on a hash function computed over any one of: the at least one object and a map of the at least one object.

7. The method of claim 6, wherein the cached object is stored in a distributed hash table.

8. The method of claim 1, wherein the at least one object contains unstructured data.

9. A method for scanning objects stored in a cloud storage system, the scanning of the objects being for a purpose other than detecting a volume failure issue, comprising:
    determining that at least one of the objects stored in the cloud storage system requires scanning;
    scanning each of the at least one object, wherein the scanning is performed using at least one scanning engine; and
    synchronizing the at least one object with a plurality of devices connected to the cloud storage system based on the scanning results
    wherein the at least one scanning engine is a threat detection engine that employs pattern matching on blocks of the at least one object to determine if the at least one object is a threat, wherein determining that an object is a threat is based on the object containing at least one suspect block, wherein a suspect block contains at least one of a non-trivial prefix or non-trivial suffix match; and
    wherein the synchronizing is performed by, when the scanning results is that the least one object is a threat, neutralizing the threat from the at least one object from the cloud store system and any device synchronized with the cloud storage system, wherein neutralizing the threat includes any one of: deleting the object from the cloud storage system and the plurality of devices, quarantining the object at the cloud storage system and the plurality of devices, and replacing the object by a safe version of the object at the cloud storage system and the plurality of devices.

10. The method of claim 9, wherein the determining if the at least one object containing at least one object requires scanning further comprises:
    checking a scanning policy for the at least one object, wherein the scanning policy defines at least a type of the at least one scanning engine.

11. The method of claim 9, wherein the at least one scanning engine performs a blocking scan, wherein the blocking scan requires completion of the scanning prior to allowing access to the object.

12. The method of claim 9, wherein the scanning further comprises:
    scanning at least one object using any one of: the at least one scanning engine running as a background process and the at least one scanning engine running as a foreground process, wherein the foreground process is triggered by an access attempt to the at least one object.

13. The method of claim 9, wherein the at least one scanning engine is any one of: a full-text indexing engine; an image cataloguing and metadata extraction engine, a content type detection engine, an e-discovery and data mining engine, an unstructured data analytics engine.

14. The method of claim 9, further comprising:
    caching the at least one scanned object based on a hash function computed over any one of: the at least one object and a map of the at least one object.

15. An apparatus for scanning objects stored in a cloud storage system, the scanning of the objects being for a purpose other than detecting a volume failure issue, comprising:
    a processing unit; and
    a memory coupled to the processing unit, the memory contains instructions that when executed by the processing unit configures the apparatus to:

determine that at least one of the objects stored in the cloud storage system that requires scanning;
scan each of the at least one object, wherein the scanning is performed using at least one scanning engine;
track objects that have been scanned by:
assign a monotonically increasing sequence number to each object;
set a high watermark value, wherein the high watermark value is a highest sequence number that has been scanned, thereby the high watermark value determines in part if subsequent scanning for the at least one object is required; and
store the high watermark value;
wherein only objects having a sequence number higher than the stored high watermark are determined to require scanning; and
synchronize the at least one object with a plurality of devices connected to the cloud store system based on the scanning results.

16. The method of claim 14, wherein the cached object is stored in a distributed hash table.

17. The method of claim 15, wherein the determining if the at least one object containing at least one object requires scanning further comprises:
checking a scanning policy for the at least one object, wherein the scanning policy defines at least a type of the at least one scanning engine.

18. The method of claim 15, wherein at least one scanning engine is a blocking scan, wherein the blocking scan requires completion of the scanning prior to allowing access to the object.

19. The method of claim 15, wherein the scanning further comprises:
scanning at least one object using any one of: at least one scanning engine running as a background process and at least one scanning engine running as a foreground process, wherein the foreground process is triggered by an access attempt to the at least one object.

20. The method of claim 15, further comprising:
caching the at least one scanned object based on a hash function computed over any one of: the at least one object and a map of the at least one object.

21. The method of claim 20, wherein the cached object is stored in a distributed hash table.

22. An apparatus for scanning objects stored in a cloud storage system, the scanning of the objects being for a purpose other than detecting a volume failure issue, comprising:
a processing unit; and
a memory coupled to the processing unit, the memory contains instructions that when executed by the processing unit configures the apparatus to:
determine that at least one of the objects stored in the cloud storage system that requires scanning;
scan each of the at least one object, wherein the scanning is performed using at least one scanning engine; and
synchronize the at least one object with a plurality of devices connected to the cloud store system based on the scanning results;
wherein the at least one scanning engine is a threat detection engine that employs pattern matching on blocks of the at least one object to determine if the at least one object is a threat, wherein determining that an object is a threat is based on the object containing at least one suspect block, wherein a suspect block contains at least one of a non-trivial prefix or non-trivial suffix match; and
wherein the synchronizing is performed by, when the scanning results is that the least one object is a threat, neutralizing the threat from the at least one object from the cloud store system and any device synchronized with the cloud storage system, wherein neutralizing the threat includes any one of: deleting the object from the cloud storage system and the plurality of devices, quarantining the object at the cloud storage system and the plurality of devices, and replacing the object by a safe version of the object at the cloud storage system and the plurality of devices.

23. The method of claim 22, wherein the determining if the at least one object containing at least one object requires scanning further comprises:
checking a scanning policy for the at least one object, wherein the scanning policy defines at least a type of the at least one scanning engine.

24. The method of claim 22, wherein at least one scanning engine is a blocking scan, wherein the blocking scan requires completion of the scanning prior to allowing access to the object.

25. The method of claim 22, wherein the scanning further comprises:
scanning at least one object using any one of: at least one scanning engine running as a background process and at least one scanning engine running as a foreground process, wherein the foreground process is triggered by an access attempt to the at least one object.

26. The method of claim 22, further comprising:
caching the at least one scanned object based on a hash function computed over any one of: the at least one object and a map of the at least one object.

27. The method of claim 26, wherein the cached object is stored in a distributed hash table.

* * * * *